3,014,016
PROCESS FOR PREPARING CRYSTALLINE HIGH POLYMERS OF UNSATURATED HYDROCARBONS
Giulio Natta, Piero Pino, and Giorgio Mazzanti, Milan, Italy, assignors to Montecatini-Societa Generale per l'Industria Mineraria e Chimica, Milan, Italy
Filed Sept. 25, 1956, Ser. No. 611,981
Claims priority, application Italy Sept. 26, 1955
10 Claims. (Cl. 260—93.5)

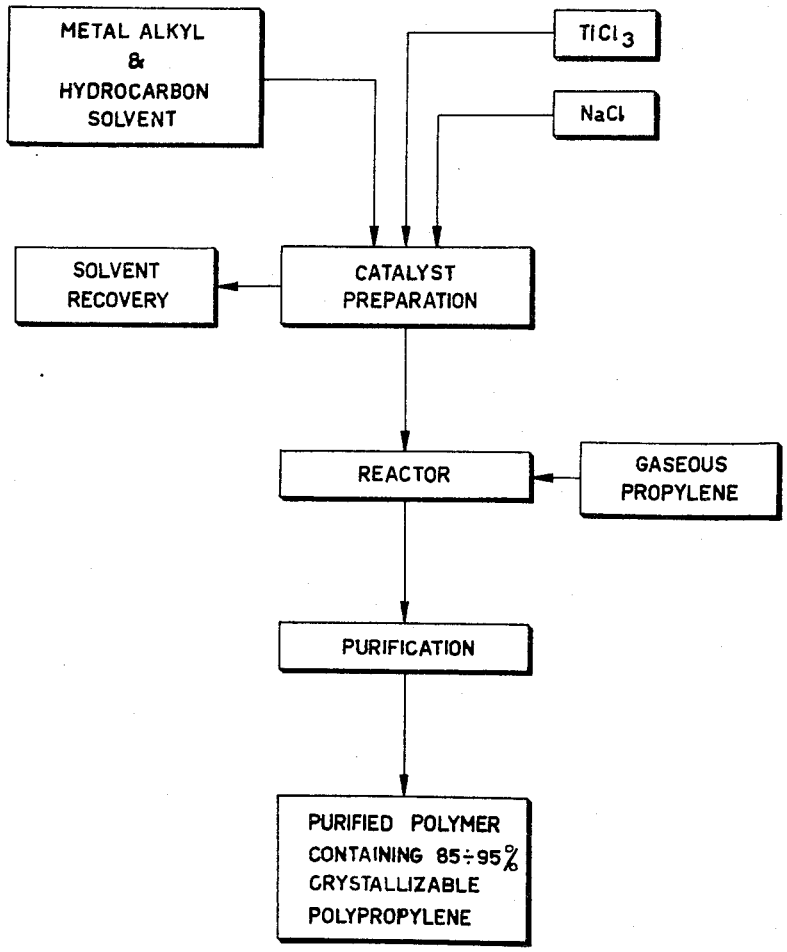

This invention relates to crystalline high polymers of alpha-olefines and to processes for producing the same.

In our pending application, Ser. No. 550,164, filed November 30, 1955, of which the present application is a continuation-in-part, we have disclosed methods for selectively polymerizing alpha-olefines to regular, head-to-tail prevailingly crystalline high polymers consisting prevailingly of isotactic macromolecules or to regular, head-to-tail prevailingly amorphous polymers, with the aid of catalysts prepared from a compound of a transition metal of the 4th to 6th groups of the Periodic Table, such as a titanium chloride, and an alkyl compound of a metal of the 2nd or 3rd column of the Periodic Table, such as triethylaluminum.

The method disclosed in said application involved steering the polymerization, at will, to the production of the prevailingly crystalline or prevailingly amorphous polymers by selection of the catalyst used.

Thus, it was disclosed that the polymerization can be steered to the production of the prevailingly amorphous (non-isotactic) polymers with the aid of a catalyst prepared from, for example, an aluminum alkyl and a transition metal compound in which the metal has the maximum valence corresponding to its position in the Periodic Table, such as titanium tetrachloride, the catalyst being suspended in a more or less dispersed state in a suitable inert solvent.

It was further disclosed that the polymerization could be steered to the production of polymers containing particularly high percentages of crystalline (isotactic) polymers by using a catalyst prepared from, say, an aluminum alkyl and a solid, crystalline transition metal compound, in which the metal has a valency lower than the maximum valency corresponding to its position in the Periodic Table, and which is insoluble in the polymerization solvent, such as titanium trichloride or vanadium trichloride.

As disclosed in the pending application, the polymerization of the alpha-olefine was always carried out either in the presence of an inert organic solvent or with monomer in the liquid phase.

The use of the solvent has disadvantages since it is not always easy to recover it completely in a sufficiently pure condition to permit of its re-use in a further polymerization run. In fact, when the polymeric alpha-olefine is purified from the residues of the catalyst by means of organic oxygen-containing compounds (alcohols), in the presence or absence of mineral acids, it is generally difficult to separate the solvent impregnating the polymer from said compounds which therefore contaminate part of the recovered solvent and render it unfit for re-use.

One object of this invention is to provide a new and improved method for polymerizing the alpha-olefines in which neither an inert solvent nor the liquid monomer is used.

Another object is to provide a new and improved method for polymerizing the alpha-olefines to obtain products containing very high percentages of crystalline polymers.

These and other objects and advantages of the invention will appear hereinafter.

Surprisingly, we have now found that if the alpha-olefines are polymerized with the aid of the catalysts of the type which tend to steer the polymerization to the production of products rich in crystalline polymers, in the absence of an organic solvent or of liquid monomer, the percentage of high molecular weight crystalline polymers produced is even greater than is produced when those catalysts are used in the presence of the solvent or liquid monomer.

It is convenient to use the solid catalyst in the form of very fine particles so that it can be easily maintained in suspension in the gaseous phase (monomer) for long periods of time.

The transition metal compound used in preparing the catalyst may be, for instance, a halide of titanium, zirconium, hafnium, thorium, vanadium, tantalum, niobium, chromium, molybdenum, tungsten or uranium, in which the metal has the lower valence. The metals listed are transition metals belonging to Groups IV to VI inclusive of the Mendeleeff Periodic Table.

The metallo-organic compound comprises an alkyl or monohaloalkyl compound of a metal of the 1st to 3rd columns of the Periodic Table, i.e., lithium from the 1st column, beryllium, magnesium, zinc, and other metals of the second group, and aluminum, gallium, and other elements of the third group.

The valencies of the aforesaid metal of the 1st to 3rd column of the Periodic Table are linked to the same or different alkyl radicals, e.g., ethyl, propyl, and butyl radicals. One valence of the metal may be satisfied by halogen. Typical metal-alkyls include triethyl aluminum, monochlorodialkyl aluminum, diethyl zinc, etc.

The transition metal compound used in practicing this invention is a solid, crystalline compound of the metal in which the metal has a valence lower than the maximum valence corresponding to its position in the Periodic Table.

The catalyst prepared by reacting such compounds of the transition metal contain a crystalline portion. By "crystalline" portion is meant a portion which presents a regularity of structure resulting from the distribution of the atoms in a crystal lattice. Such catalysts are obtained, for instance, from a solid, crystalline compound (e.g. $TiCl_2$, $TiCl_3$, $VCl_3$), which when mixed with the metal-alkyl does not undergo destruction of its crystal lattice.

As shown in the following examples, the catalyst may be prepared by suspending the solid transition metal compound, for instance powdery titanium trichloride, in a hydrocarbon solvent, such as pentane, n-heptane, isooctane or anhydrous benzene, adding the metal-alkyl such as triethyl aluminum, or diethyl aluminum monochloride, and heating the suspension to approximately 50° C.

The solid transition metal compound and the metal-alkyl may be milled together in the presence of the solvent to obtain catalyst in finely divided form, after which the solvent may be removed.

Instead of titanium trichloride, other solid, crystalline transition metal compounds in which the metal has the low valency may be used. For instance, the corresponding compound of divalent titanium ($TiCl_2$) is suitable for the production of catalysts which steer the polymerization to the production of crystalline polymers of the alpha-olefines. Such compounds as solid, crystalline vanadium trichloride, zirconium trichloride and chromium trichloride may also be used.

We assume that the solid, crystalline catalysts (for instance those containing titanium as the transition metal and obtained by (a) starting with $TiCl_3$ and (b) mixing said halide with triethyl aluminium) are particularly adapted to use as catalysts in the formation of polymers of the alpha-olefines having an isotactic arrangement of the asymmetric carbon atoms in the main chain and, correspondingly isotactic, crystallinity.

If the catalyst as prepared in the presence of solvents and before their removal comprises both coarse crystalline particles and finely dispersed to dissolved or liquid portions, it can be separated into several fractions one of which consists of the coarser, more crystalline particles which may preferably be used as catalyst in the present polymerization process.

Known separation methods, e.g. decantation, floatation or centrifuging may be used to separate the more crystalline (heavier) portions of the catalyst from the amorphous (generally lighter) portions thereof.

The coarser, more crystalline catalyst portions are reduced to fine crystalline particles when milled with the metal-alkyl compound.

In carrying out the present method, the catalyst may be prepared by introducing the selected transition metal compound, the selected metallo-organic compound and the hydrocarbon solvent, such as pentane, into the reactor in which the polymerization is to be effected, for example a rotating autoclave, milling the mixture in an atmosphere of an inert gas, removing the solvent to leave the catalyst in the form of fine particles, introducing the gaseous alpha-olefine, and agitating the mass until the polymer is produced.

At the end of the polymerization, the polymer after removal of the unchanged monomer (for example by displacement with nitrogen) can be removed from the reactor in the form of a powder.

The polymerization may be carried out continuously, by continuously introducing the monomer and catalyst into the reactor and withdrawing the polymer continuously by entrainment in a stream of gas or by means of a screw conveyor supported on the bottom of the reactor. The transfer and purification steps are thus simplified with increase in the yield obtained, based on the weight of catalyst used.

When the method is carried out on a batch basis using a solid catalyst consisting of crystals of $TiCl_3$ or $VCl_3$ treated with aluminum alkyls, it may happen that the catalyst crystals become gradually covered by a film of the polymer being formed. This has the effect of reducing diffusion of the gaseous olefine and thereby reducing the rate of polymerization. This problem can be eliminated by using the catalyst in a very fine state of dispersion such as can be obtained by milling it with an inert solid which facilitates the grinding, for instance, dry sodium chloride.

The crude polymer is prevailingly crystalline. However, the crystalline polymer is generally mixed with small amounts of low molecular weight oily polymers extractable with acetone, and/or a small amount of amorphous polymers extractable with ether. The highly crystalline polymers are not extractable with heptane. Residue remaining after the heptane extraction comprises, also, highly crystalline polymers. The oily and amorphous polymers may be separated. The amounts thereof present in the raw polymer are smaller than may be present in the corresponding polymers produced in the presence of a solvent or with the liquid monomer. For many purposes the raw polymerizate as produced by the present method may be used as such for purposes for which crystalline polymers consisting at least prevailingly of isotactic macromolecules are adapted.

Our linear, regular head-to-tail macromolecules having substantially no branches longer than R and the main chain of which has substantially a structure of the kind illustrated in the model below (isotactic structure) are

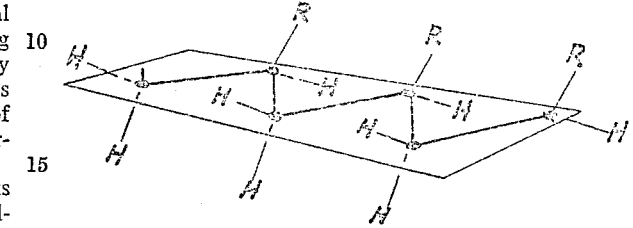

(Model of a portion of the main chain of a crystalline poly (alpha-olefin) according to the present invention, arbitrarily fully extended in a plane, in which the R substituents on the tertiary C atoms of successive monomeric units are all above and their H atoms below the plane of the chain.)

recognized in the art (following us) as "isotactic" macromolecules, whereas our macromolecules having substantially no branches longer than R and in which the asymmetric carbon atoms of the two possible steric configurations have a substantially random distribution along the main chain are recognized in the art (following us) as "linear, regular head-to-tail atactic" macromolecules.

We have adopted the term "isotactic" for identifying the structure shown in the model, the macromolecules having substantially that kind of structure, and polymers consisting of these macromolecules having substantially that kind of structure. (See, for example, the Natta et al. communication to the editor of the Jr. of Amer. Chem. Soc. published in said Journal on March 20, 1955, received for publication December 10, 1954, and the Natta paper published in the Journal of Polymer Science, April 1955, vol. XIV, Issue No. 82, pp. 143-154, received for publication on February 17, 1955.)

The following table, in which data on the solvent extraction of crude polymers of the alpha-olefines obtained under comparable conditions using the same catalysts, but with and without a solvent being present during the polymerization, demonstrates the advantages obtained by effecting the polymerization in the absence of a solvent.

TABLE II

| Polymer | Acetone Extract, Percent | Ether Extract | | Heptane Extract | | Residue | |
|---|---|---|---|---|---|---|---|
| | | Percent | ($\eta$) | Percent | ($\eta$) | Percent | ($\eta$) |
| Polypropylene (without solvent) | 2.3 | 3.9 | 0.35 | 2.3 | 0.49 | 91.5 | 4.1 |
| Polypropylene (with solvent; n-heptane) | 5.7 | 4.1 | 0.68 | 12.6 | 1.95 | 77.6 | 2.05 |
| Polybutene (with solvent) | 5.3 | 13.9 | 0.46 | | | 80.7 | 1.07 |
| Polybutene (with solvent; n-heptane) | 3.44 | 33.8 | 0.33 | | | 62.7 | 1.00 |

($\eta$)=intrinsic viscosity of the polymers measured in tetralin solutions at 135° C.

As will be apparent, the polymers prepared in the absence of solvent in accordance with this invention comprise a much higher percentage of isotactic, crystallizable polymers than do the products obtained in the presence of solvent.

The polymers produced in the absence of a solvent exhibit, when molded in the raw or crude state, a lower plasticity and higher softening temperatures than the polymers produced under the same conditions but in the presence of solvents. The polypropylenes obtained by the present method and containing smaller amounts of amorphous products than the polymers produced in the presence of solvent, have more pronounced dimensional stability at high temperatures and are adapted to use under conditions requiring that the polymer withstand high temperatures without warping. For example, films or sheets of the more dimensionally stable polymers are adapted to use as packaging material or as containers for products that must be sterilized, after the packaging, at temperatures above 100° C. The dimensionally stable, highly crystalline polymers are useful for the production of strong, thin films consisting of oriented crystals, or for extrusion to fibers having high tensile strength, high modulus of elasticity and low plastic deformation.

Unsaturated hydrocarbons which may be polymerized in accordance with the invention may be represented by the general formula

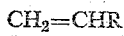

in which R is hydrogen, or an alkyl or aryl radical containing from 1 to 16 carbon atoms. Included are ethylene, propylene, butene-1, pentene-1, hexene-1, and styrene. It is particularly noteworthy that, in addition to the higher olefines, ethylene may also be polymerized by the present method to obtain highly crystalline polyethylene of very high (above 200,000) molecular weight.

The following examples are given to illustrate specific embodiments of the invention, it being understood that these examples are not intended as limitative.

*Example 1*

10 stainless steel balls, 3 g. titanium trichloride, 30 g. calcined sodium chloride and a solution of 3.2 g. triethyl aluminum in 150 cc. pentane are introduced into a rotating autoclave of 2,500 cc. capacity and filled with nitrogen. The mixture is milled for some hours in an atmosphere of nitrogen at room temperature. The autoclave is then heated to 50° C. and the pentane is completely removed under a vacuum of 20 mm.

After the pentane has been removed, the autoclave which is continuously rotated, is heated to 90° C. and butene-1 is introduced up to a pressure of 3 atmospheres. When decrease in the pressure is noted, additional butene-1 is introduced until the pressure is restored to the initial value. This operation is repeated several times until 45 g. of butene-1 are introduced into the autoclave.

After about 20 hours from the beginning of the run, 50 cc. of methanol are pumped into the autoclave and the reaction product is discharged. It is purified from the inorganic materials present by treatment with hot ether and hydrochloric acid and subsequent complete coagulation with a large amount of methanol. After filtration and vacuum drying in the heat, the product amounts to 30 g. of a solid polybutylene which is then fractionated by extraction with hot solvents.

The acetone extract corresponds to 5.1% of the polymer obtained and consists of oily low molecular weight products. The ether extract corresponds to 13.9% of the polymer obtained and consists of an amorphous solid polybutene having an intrinsic viscosity of 0.465 (in tetralin solution at 135° C.). The heptane extract, corresponding to 81% of the polymer obtained, consists of a highly crystalline, solid polybutene and shows an intrinsic viscosity of 1.07.

*Example 2*

Ten steel balls of 1 inch diameter, 4 g. titanium trichloride and a solution of 6 g. diethyl aluminum monochloride in 200 cc. anhydrous pentane are introduced into a stainless steel rotating autoclave of 2500 cc. capacity filled with nitrogen. The mixture is milled at room temperature in an atmosphere of nitrogen for about 20 hours. After said period of time, all the solvent is removed by heating the autoclave under reduced pressure up to a temperature of 50° C. The autoclave is then heated up to 75° C. and pure gaseous propylene is added up to a pressure of 10 atmospheres. A sudden pressure drop is noticed, whereas the temperature rises spontaneously up to 90° C. When the pressure has reached 5 atmospheres, more propylene is added up to 10 atmospheres. This operation is repeated several times until a total of 87 g. propylene is introduced. Methanol is then pumped into the autoclave and the polymer obtained, which is in the form of a very fine powder of a light yellow color, is taken out. The product is purified from the inorganic substances present by suspending it several times in methanol and hydrochloric acid. 70 g. of a white solid polypropylene powder are thus obtained. The polymer is fractionated by extraction with hot solvents, using in succession acetone, diethyl ether and n-heptane.

The acetone extract corresponds to 2.3% of the polymer obtained and consists of oily, low molecular weight products.

The ether extract corresponds to 3.9% of the polymer obtained and consists of an amorphous solid polypropylene having an intrinsic viscosity of 0.35 (in tetralin solution at 135° C.).

The heptane extract corresponds to 2.3% of the polymer obtained and consists of a partially crystalline polypropylene having an intrinsic viscosity of 0.49. The residue remaining after said extractions corresponds to 91.5% of the polymer obtained and consists of a highly crystalline polypropylene having an intrinsic viscosity of 4.1.

*Example 3*

1.5 g. titanium trichloride and a solution of 0.24 g. triethyl aluminum in 20 cc. anhydrous pentane are introduced under nitrogen into a glass flask of 500 cc. capacity. After a short time, all the solvent present is removed by heating the flask up to 40° C. under a vacuum of 15 mm. Thereafter, ethylene, previously purified by bubbling through a 50% heptane solution of diethyl aluminum monochloride, is introduced into the flask. A sharp spontaneous temperature increase up to 80° C. is noticed. This temperature is maintained by cooling the flask by means of an oil bath and ethylene is passed through the apparatus for about 40 minutes. After this period of time the introduction of the olefine is stopped and the reaction mixture is treated with methanol and hydrochloric acid in order to decompose the organo-metallic compounds present. The polymer obtained is purified with decalin and hydrochloric acid in the heat, coagulated completely with acetone, filtered and washed with methanol. After vacuum drying in the heat, the polymer consists of 10 g. of a white powdery solid polyethylene. The polyethylene thus obtained shows in tetralin solution at 135° C. an intrinsic viscosity of 3.5 corresponding to a molecular weight of 220,000, and appears crystalline at an X-ray examination.

*Example 4*

1.5 g. titanium trichloride and a solution of 0.24 g. triethyl aluminum in 30 cc. anhydrous pentane are introduced under nitrogen into a glass flask of 500 cc. capacity. The solvent present is then removed completely and a slow stream of anhydrous propylene is introduced into the flask. The flask is heated to 60–70° C. and propylene is passed through it for 5 hours. After said period of time the catalyst is decomposed with methanol and HCl and the polymer obtained is purified by hot treatment with ether and hydrochloric acid. The polypropylene obtained is then coagulated completely with methanol, filtered, washed with methanol and vacuum dried in the heat. The polymer obtained does not contain portions which can be extracted either with acetone or hot ether, and consists for 8.5% of a polypropylene which is extractable with hot heptane, appears partially crystalline at an X-ray examination and shows an intrinsic viscosity in tetralin solution at 135° C. equal to 0.45. The residue that remains after the extraction with heptane corresponds to 91.5% of the polymer obtained, and consists of a highly crystalline polypropylene.

Example 5

Proceeding as in Example 4, but using, instead of triethyl aluminum, 0.30 g. of diethyl aluminum monochloride, a solid polymer which appears highly crystalline at an X-ray examination is similarly obtained.

The process of the invention is illustrated in the accompanying flow sheet.

It will be apparent from the examples that use of the catalysts described, and polymerization of the gaseous higher alpha-olefins with the aid thereof in the absence of solvent, results in polymerizates the major portion of which, usually not less than 80%, are crystalline. The polymers have the linear, regular, head-to-tail isotactic structure, molecular weights up to 100,000 and higher and, in the case of polypropylene and as shown in the examples, yield a residue non-extractable with boiling n-heptane which amounts to more than 90% of the crude polymerizate.

Since some changes and modifications in details may be made in practicing the invention without departing from the spirit and scope thereof, it is to be understood that it is not intended to limit the invention except as defined in the appended claims.

What is claimed is:

1. In a process for producing, from unsaturated hydrocarbons of the formula $CH_2=CHR$ in which R is selected from the group consisting of alkyl radicals containing 1 to 4 carbon atoms, and the phenyl radical, substantially linear, regular head-to-tail polymerizates consisting prevailingly of isotactic macromolecules, by polymerizing the unsaturated hydrocarbon, in the substantial absence of oxygen, in contact with a substantially solid, hydrocarbon solvent-insoluble stereospecific catalyst prepared by (a) starting with a solid, crystalline halide of a transition metal belonging to Groups IV to VI inclusive of the Mendeleeff Periodic Table in which the metal has a valency lower than the maximum valency corresponding to its position in the Periodic Table, and (b) mixing said halide with a compound of an element belonging to Groups I to III inclusive of the Periodic Table in which at least all but one of the valencies of the element are satisfied by alkyl radicals containing from 2 to 4 carbon atoms and the remaining valency, if any, is satisfied by a member selected from the group consisting of the alkyl radicals and halogen, the mixing of the solid crystalline transition metal compound and the alkyl compound of the element being carried out in a liquid diluent inert to the alkyl compound of the element, the improvement which consists in polymerizing the unsaturated hydrocarbon in contact with the catalyst while the hydrocarbon is in the gaseous phase, and in the absence of solvents.

2. The process according to claim 1, characterized in that the catalyst is in the form of fine particles suspended in the gaseous unsaturated hydrocarbon.

3. The process according to claim 1, characterized in that the catalyst is prepared by (a) starting with solid, highly crystalline titanium trichloride, and (b) mixing the trichloride with triethyl aluminum.

4. The process according to claim 1, characterized in that the catalyst is prepared by (a) starting with solid, highly crystalline titanium trichloride and (b) mixing the trichloride with diethyl aluminum monochloride.

5. The process according to claim 1, characterized in that the catalyst is prepared by (a) starting with the solid, highly crystalline halide of the transition metal and (b) treating said halide with a solution of the alkyl compound of the element in a volatile solvent which is inert to the alkyl compound of the element, followed by evaporation of the solvent after the catalyst is formed by mixing of the alkyl compound of the element with the crystalline halide.

6. The process according to claim 1, characterized in that the catalyst is prepared by (a) starting with solid, highly crystalline substantially pure titanium trichloride and (b) mixing the trichloride with triethyl aluminum in the liquid diluent inert to the triethyl aluminum and at a temperature of about 50° C.

7. A process for the continuous production of substantially linear, regular head-to-tail polymerizates consisting prevailingly of isotactic macromolecules, from unsaturated hydrocarbons of the formula $CH_2=CHR$ in which R is selected from the group consisting of alkyl radicals containing from 1 to 4 carbon atoms, and the phenyl radical, which process comprises continuously bringing fresh portions of the unsaturated hydrocarbon to be polymerized in the gaseous phase and in the absence of solvents into intimate contact with a finely divided solid, stereospecific catalyst prepared by (a) starting with a solid, crystalline halide of a transition metal belonging to Groups IV to VI inclusive of the Mendeleeff Periodic Table in which the metal has a valency lower than the maximum valency corresponding to its position in the Periodic Table, and (b) mixing said halide with a compound of an element belonging to Groups I to III inclusive of the Periodic Table in which at least all but one of the valencies of the element are satisfied by alkyl radicals containing from 2 to 4 carbon atoms and the remaining valency, if any, is satisfied by a member selected from the group consisting of said alkyl radicals and halogen, the mixing of the crystalline halide with the alkyl compound of the element being carried out in a liquid diluent inert to the alkyl compound of the element, and continuously removing the polymerizate formed from the vicinity of the catalyst.

8. The process according to claim 7, characterized in that the catalyst is prepared by (a) starting with the solid transition metal halide and (b) grinding said halide together with the alkyl compound of the element, in a liquid medium comprising an inert hydrocarbon solvent, and at a temperature of about 50° C.

9. The process according to claim 7, characterized in that the catalyst is prepared by (a) starting with the solid transition metal halide, and (b) grinding said halide together with the alkyl compound of the element, in an inert hydrocarbon solvent containing anhydrous sodium chloride, and at a temperature of about 50° C.

10. The process according to claim 7, characterized in that the catalyst is prepared by (a) starting with solid, highly crystalline substantially pure titanium trichloride and (b) mixing the trichloride with triethyl aluminum in the liquid diluent inert to the triethyl aluminum and at a temperature of about 50° C.

References Cited in the file of this patent

UNITED STATES PATENTS

| | | |
|---|---|---|
| 2,259,961 | Myddleton | Oct. 21, 1941 |
| 2,710,854 | Seelig | June 14, 1955 |
| 2,721,189 | Anderson et al. | Oct. 18, 1955 |
| 2,822,357 | Berbner et al. | Feb. 4, 1958 |
| 2,846,426 | Larson et al. | Aug. 5, 1958 |

FOREIGN PATENTS

| | | |
|---|---|---|
| 533,362 | Belgium | May 16, 1955 |
| 538,782 | Belgium | Dec. 6, 1955 |
| 526,101 | Italy | May 14, 1955 |

OTHER REFERENCES

Natta: J. Polymer Sci., vol. XVI, April 1955, pages 143–154.